Aug. 30, 1966  V. D. POLHEMUS  3,269,493
EXTERNAL WHEEL CYLINDER
Filed July 8, 1964
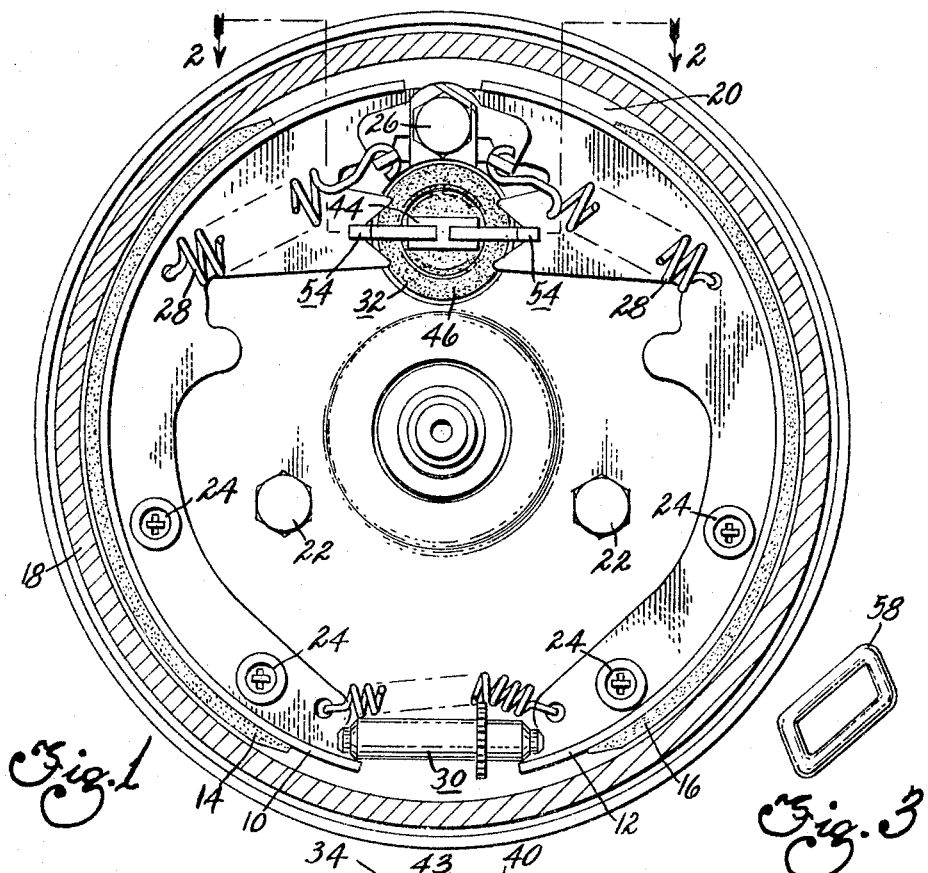
Fig. 1
Fig. 3
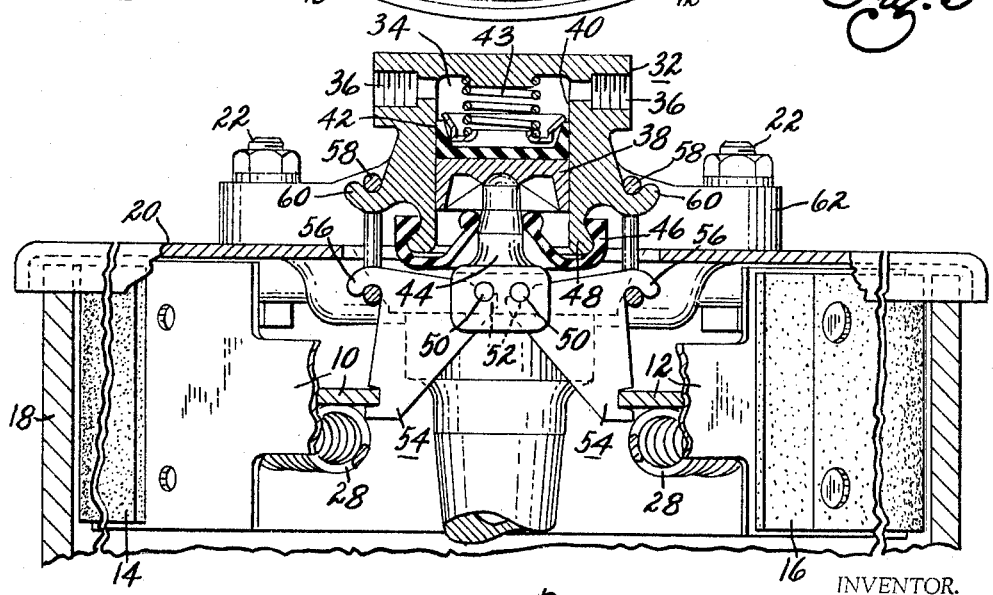
Fig. 2
INVENTOR.
VON D. POLHEMUS
BY
D. D. McGrant
HIS ATTORNEY

United States Patent Office 3,269,493
Patented August 30, 1966

3,269,493
EXTERNAL WHEEL CYLINDER
Von D. Polhemus, Franklin, Mich., assignor to General Motors Corporation, Detroit, Mich., a corporation of Delaware
Filed July 8, 1964, Ser. No. 381,172
7 Claims. (Cl. 188—152)

This invention relates to brake actuating mechanism and more particularly to a vehicle hydraulic braking system wherein the wheel cylinder is positioned outside the braking area and actuation is accomplished through mechanical linkage.

It is desirable in hydraulic braking systems to have the hydraulic fluid and seals for the hydraulic system positioned where they are not susceptible to extreme heating, this, heating, of course, being generated by the frictional engagement of brake linings with a rotatable drum. However, where hydraulic portions of the brake system are remote from the braking area, a problem of balanced brake actuation arises. This invention is meant to obviate the aforementioned problem.

It is an object of the present invention to provide an improved brake actuating mechanism.

It is another object of the present invention to provide an improved braking system wherein hydraulic components associated therewith are positioned outside the area susceptible to braking heat and suitable linking and actuating means are provided therefrom for proper brake actuation.

It is still another object of the present invention to provide an improved braking system wherein braking components of standard design are used but where hydraulic components are situated at a remote point and actuating mechanism is used which allows balanced forces to be exerted during braking.

It is a further object of the present invention to provide an improved brake actuating mechanism which is hydraulically powered and mechanically applied at right angles to the direction of hydraulic power input.

It is still a further object of the present invention to provide an improved brake actuating mechanism which is compatible with systems of common design and which provides the advantage of having the hydraulic components situated outside the area of maximum heat generation.

Further objects and advantages of the present invention will be apparent from the following description, reference being had to the accompanying drawings wherein a preferred embodiment of the present invention is clearly shown.

In the drawings:

FIGURE 1 is an elevational view of a typical vehicle brake having the subject invention mounted thereon;

FIGURE 2 is a sectional view taken along line 2—2 of FIGURE 1;

FIGURE 3 is a perspective view of the chain link pivotally carrying the actuating lever mechanism.

Referring now to FIGURE 1, brake shoes 10 and 12, carrying frictional elements 14 and 16 respectively, are illustrated as being positioned an operative distance away from a rotatable drum 18. The brake shoes illustrated herein are of conventional design and perform a braking action by being driven outwardly, as viewed in FIGURE 1, into frictional engagement with the rotatable drum 18. Typically, the brake shoes and frictional elements are mounted on a backing plate 20. The backing plate 20 may be attached in a non-rotatable manner by means of bolts 22 to the axle housing of a vehicle. The brake shoes 10 and 12 are biasedly carried on the backing plate 20 by means of hold-down springs 24. Anchor pin 26 carried by the backing plate 20 engages the brake shoes 10 and 12 on one end and the shoes are kept in biased engagement therewith by return springs 28. An adjusting mechanism, generally designated by numeral 30, serves to vary the static distance between opposite ends of the brake shoes 10 and 12 relative to the drum, thereby regulating the separation between the frictional elements 14 and 16 and the brake drum 18 as the elements wear during repeated braking actuations.

Referring now to FIGURE 2, a hydraulic wheel cylinder, generally designated by numeral 32, includes a chamber 34 disposed in fluid communication with inlets 36 from a typical hydraulic brake pressurizing system. A piston 38 is slidably disposed in a bore 40 of the wheel cylinder 32 and is responsive to a build-up of hydraulic pressure in chamber 34 for movement in one direction. When hydraulic pressure in chamber 34 diminishes, the hold-down springs 28 of the brake shoes return the piston to a poised position in a manner to be hereinafter described. A sliding seal or cup 42 disposed against the power side of the piston 38 serves to prevent the casual passage of hydraulic fluid from the chamber 34 past the piston 38.

A drive pin 44 is seated against the piston 38 and is adapted to move translationally in response to pressure from the piston 38. A resilient cup 46 peripherally engages the drive pin 44 and flared end 48 of the wheel cylinder 32 to prevent dirt and extraneous material from coming into contact with the bore 40.

The drive pin 44 has pivot pins 50 carried on a surface thereof which are arranged to engage pockets 52 formed on one surface of levers or bell cranks 54. The bell cranks 54 are substantially triangular shaped and include a hooked corner 56 arranged to pivotally engage chain links 58. One of the chain links 58 is illustated in a perspective view in FIGURE 3. The chain links 58 also pivotally engage hooked portions 60 formed on the outer periphery of the wheel cylinders 32 and in the preferred form are integral therewith. A third corner of these substantially triangular-shaped bell cranks 54 engage opposed ends of the brake shoes 10 and 12. In the embodiment illustrated in FIGURE 2, the wheel cylinder 32 is formed as an integral part of an axle flange 62 to which the backing plate 20 is attached. It is obvious that the wheel cylinder 32 can be a separate unit from the axle flange 62 or might be formed integrally with a steering knuckle when used as front wheel brakes of a vehicle. It is also obvious that the wheel cylinder 32 could be insulatedly mounted with respect to the backing plate 20 in order to minimize the heat transfer between the drum 18 and the hydraulic components contained within the wheel cylinder 32.

It should be noted that the return springs 28 normally bias the brake shoes 10 and 12 toward the anchor pin 26 and, consequently, toward the bell cranks 54. Referring to FIGURE 2, the return springs 28 therefore hold the shoes 10 and 12 in engagement with the anchor pin 26 during periods of time when the brakes are not applied. A force generated by a spring 43 maintains the piston 38 and the drive rod 44 in biased engagement with the bell cranks 54 as they tend to pivot around the chain links 58.

It then becomes obvious that a static pressure is always present against the brake shoes 10 and 12 through the bell cranks 54 and tends to maintain the bell cranks 54 poised for operation against the shoes 10 and 12 which are held by an opposing force created by the return springs 28.

In operation, hydraulic pressure is developed in a vehicle brake pressurizing system in any well-known manner which in turn causes the chamber 34 of the wheel cylinder 32 to become pressurized. As the force exerted by the hydraulic pressure in the chamber 34 exceeds the force of the return springs 28, the piston 38 is driven in one direction in the bore 40. As the piston 38 moves, the drive pin 44 moves in the same direction. The pivot pins 50 engaging the bell cranks 54 pivot the bell cranks 54 around the chain links 58 in a pivotal manner. It should be noted that the bell cranks 54 pivotally engage the chain links 54 which in turn engage the hooked ends 60 of the wheel cylinders 32 in which the piston 38 moves. Therefore, the chain links are pivotable relative to the pivoting bell crank 54.

As the bell cranks 54 pivot around the chain links 58, a force is exerted against the brake shoes 10 and 12 against the force of the return springs 28, resulting in the frictional elements 14 and 16 being driven into frictional engagement with rotatable drum 18. The rotatable drum 18 being carried by a wheel of the vehicle is impeded in its rotation thereby and a braking action results. It should be noted that the servo action generated by the rotating drum 18 against the brake shoes 10 or 12 is allowed to take place in a normal fashion due to the free pivoting action of the chain links 58. This servo action is possible and compensated for in the actuating mechanism whether the vehicle is traveling in a forward or reverse direction. It should likewise be noted that many braking systems of common design have automatic adjusting features which utilize the servo action generated during a breaking action for their adjusting movement. The actuating mechanism herein described allows this adjusting action to take place without impedance.

When pressure from the hydraulic pressurizing system diminishes, hydraulic pressure in chamber 34 is relieved and return springs 28 become dominant and draw the brake shoes 10 and 12 toward the anchor pin 26. This movement of the brake shoes 10 and 12 also moves the bell cranks 54 against the pivot pins 50 resulting in a return movement of the drive pin 44 and the piston 38 through the bore 40. The piston 38 will be moved against the force of the spring 43 until the brake shoes 10 and 12 are again seated against the anchor pin 26. When this cycle is completed, the system, as described, is in a poised position capable of immediate reactuation.

A feature of utility of the present invention that should be noted is the remote positioning of the wheel cylinder 32 while still maintaining the capability of conventional brake actuation. The remote positioning of the wheel cylinder 32 serves the dual purpose of minimizing the chance of boiling of the hydraulic fluid in the chamber 34 and also serves to decrease the heat acting upon the resilient cup 46 and the piston seal 42. Longer life can be anticipated from these resilient members than can be anticipated when the wheel cylinder is positioned near the area in the brake drum where heat is generated during the braking action.

Another feature of utility is the floating capability of the linking mechanism which can accommodate a slightly angular movement of the drive pin 44 relative to the piston 38 when servo action of the brake shoes 10 and 12 takes place. The chain links 58 provide a novel structure for accomplishing this result and also act as force equalizers between the brake shoes 10 and 12 when pressure is exerted on the piston 38 by hydraulic pressure. The pivoting portions of the actuating mechanism lend themselves to loose tolerance construction and, therefore, minimize manufacturing cost of the system components. The loose tolerance of their construction also lends to their utility during periods of high heat generation during the braking action with a minimum of contact in their pivotal engagements which serves to minimize heat transfer to the hydraulic mechanism.

Another feature of utility to be noted is the adaptability of the bell cranks 54 to be redimensioned from their substantially triangular shape to allow a force multiplication between the hydraulic force and the resultant force needed to drive the brake shoes 10 and 12 into frictional engagement with the drum 18. This could be accomplished by anyone skilled in the art utilizing this invention in a given installation where it is desirable to have a force multiplication between the hydraulic pressure input and the braking force required.

While the embodiment of the present invention, as herein disclosed, constitutes a preferred form, it is to be understood that other forms might be adopted.

What is claimed is as follows:

1. Brake actuating mechanism for a vehicle, said mechanism comprising: fluid operable means carried by a fixed portion of the vehicle and mounted external to a vehicle brake drum; friction means carried by a fixed portion of the vehicle and adapted to frictionally engage a rotatable portion of the vehicle in order to provide a braking action therefor; lever means engaging said friction means; output means from said fluid operable means being adapted to move translationally in response to a pressure build-up in the fluid operable means; and means mechanically engaging said output means and said lever means for connecting a portion of the lever means and the fluid operable means thereby providing a non-rigid connection therebetween; said lever means being adapted to pivot on said last named means in response to translational movement of the output means thereby driving the friction means into frictional engagement with the rotatable portion of the vehicle to effect a braking action thereon.

2. Brake actuating mechanism for a vehicle having at least one frictional element adapted to engage a rotatable drum carried by the vehicle, said mechanism comprising: fluid operable means carried by a fixed portion of the vehicle externally of the rotatable drum and being responsive to hydraulic pressure build-up; output means from said fluid operable means adapted to move translationally in response to a pressure buildup in the fluid operable means; lever means drivably engaged by the output means and frictional element; linking means engaging the fluid operable means and the lever means to provide a variable non-rigid pivot point around which the lever means pivots to drive the frictional element into engagement with the rotatable drum in response to hydraulic pressure build-up in the fluid operable means.

3. Brake actuating mechanism according to claim 2 wherein the fluid operable means is a hydraulic cylinder mounted at a point on the vehicle remote from the area in which the braking action takes place.

4. Brake actuating mechanism according to claim 2 wherein the output means is a piston driven plunger adapted to pivotally engage the lever means.

5. Brake actuating mechanism according to claim 2 wherein the lever means is a bell crank pivotally supported and adapted to be driven pivotally by a pressure build-up in the output means in a manner which drives the frictional element into frictional engagement with the rotatable drum of the vehicle to bring about a braking action.

6. A brake actuating mechanism according to claim 2 wherein the linking means is a closed looped member adapted to pivotally engage the fluid operable means and the lever means to provide a variable pivot point for the lever means as the output means drives the lever means in a pivotal manner to effect a frictional engagement of the friction means with the rotatable drum.

7. A brake actuating mechanism for a vehicle having at least two brake shoes adapted to be driven into frictional engagement with a rotatable drum to effect a braking action, said mechanism comprising: a hydraulic cylinder carried by a fixed portion of the vehicle at a point remote from the rotatable drum and adapted to be responsive to hydraulic pressure from the vehicle brake pressurizing system; a drive pin responsive to pressure build-up within said hydraulic cylinder to be moved translationally, said drive pin carrying a plurality of pivot pins; bell crank means having contoured portions arranged to cooperate with the pivot pins carried by the drive pin; link means pivotally engaging the hydraulic cylinder and a portion of the bell crank means to provide a variable pivot point around which the bell crank means moves during translational movement of the drive pin; said bell crank means having portions adapted to cooperate with the frictional elements during translational movement of the drive pin occasioned by pressure build-up in the hydraulic cylinder whereby the frictional elements are driven into frictional engagement with the rotatable drum of the vehicle to effect a braking action.

References Cited by the Examiner
UNITED STATES PATENTS

| | | | |
|---|---|---|---|
| 2,162,775 | 6/1939 | Dick | 188—152 |
| 2,376,686 | 5/1945 | Goephrich | 188—152 |
| 3,115,952 | 12/1963 | Erickson | 188—152 |
| 3,162,273 | 12/1964 | Burnett | 188—152 |

DUANE A. REGER, *Primary Examiner.*